United States Patent Office 3,658,923
Patented Apr. 25, 1972

3,658,923
HALOMETHYLATION OF TRIMETHYLBENZENES
Paul R. Stapp, Bartlesville, Okla., assignor to
Phillips Petroleum Company
No Drawing. Filed Dec. 29, 1969, Ser. No. 888,909
Int. Cl. C07c 25/14
U.S. Cl. 260—651 HA                                           8 Claims

ABSTRACT OF THE DISCLOSURE

Halomethylation of trimethylbenzenes is obtained by contacting the trimethylbenzene with HCHO and a hydrogen halide in the presence of liquid $SO_2$ at a temperature ranging from $-100$ to $-10°$ C.

This invention relates to a process for the halomethylation of a trimethylbenzene.

Numerous methods for the halomethylation of aromatic compounds are known. In general, these involve the reaction of the aromatic compound with formaldehyde and a hydrogen halide.

An object of this invention is to provide an improved process for the halomethylation of a trimethylbenzene.

Other objects, aspects and advantages will become apparent to one skilled in the art upon consideration of the following disclosure and the appended claims.

It now has been found that unexpectedly high yields of halomethyl trimethylbenzenes are obtained by contacting the trimethylbenzene with HCHO and a hydrogen halide in the presence of liquid $SO_2$ at a temperature ranging from $-100$ to $-10°$ C.

The trimethylbenzenes can be any trimethylbenzene such as 1,2,4-trimethylbenzene, 1,2,3-trimethylbenzene, or 1,3,5-trimethylbenzene. The halomethyl trimethylbenzenes can be any halomethyl trimethylbenzene such as 1-chloromethyl-2,4,5-trimethylbenzene, and the like.

HCHO can represent monomeric formaldehyde, paraformaldehyde, trioxane, and the like; but aqueous formaldehyde such as formalin is not included in this invention.

The hydrogen halide is any of the halides: fluoride, chloride, bromide or iodide.

The contact of the reactants and liquid $SO_2$ is carried out at temperatures ranging from $-100$ to $-10°$ C., preferably $-80$ to $-30°$ C. According to the process of this invention, pressure sufficient to maintain the reactants and $SO_2$ in the liquid phase are employed. Preferably, the pressure ranges from 0.5 to 100 atmospheres, including atmospheric pressure. The reaction time can vary widely, but generally is in the range of 10 minutes to 72 hours.

The conversion of this invention can be represented as follows:

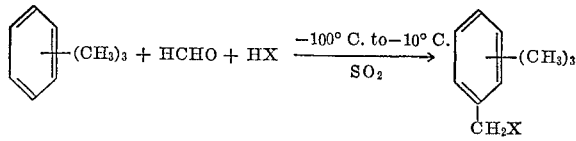

wherein X is a halogen such as chlorine, bromine, iodine and fluorine.

The reaction is carried out under substantially anhydrous conditions. Any water which is inadvertently introduced to the reaction zone is substantially frozen out at the temperatures employed.

The mole ratio of trimethylbenzene to HCHO ranges from 5:1 to 1:1, preferably from 3:1 to 2.5:1. The mole ratio of hydrogen halide to HCHO ranges from 10:1 to 0.5:1, preferably 5:1 to 1:1. Liquid $SO_2$ normally comprises 10 to 90 weight percent of the liquid reaction environment, preferably 30 to 70 weight percent.

The halomethylation reaction can be carried out in either batch or continuous operations. In either case the reactants are charged to a suitable pressure vessel equipped with stirring or other means for obtaining intimate contact of the reactants and with means for temperature control. After the reaction has reached the desired degree of completion, which can be determined by any suitable method such as halogen analysis of a sample of the product, the reaction products are discharged from the reactor and separated by suitable means, as by distillation, and unconverted reactants are recycled.

The product can be recovered and isolated by any method known in the art. It is generally desirable to remove the excess hydrogen halide from the reaction mixture by water-washing or by washing the reaction mixture with an aqueous solution of sodium bicarbonate. The resulting reaction mixture then can be distilled or separated by any suitable means.

Though not essential to the process of this invention, a strong acid can be employed as a catalyst for the conversion of this invention. For example, acids such as sulfuric, phosphoric, perchloric or hydrocarbon sulfonic acid having in the range of 1 to 8 carbon atoms per molecule, and the like, can be employed. In general, catalytic amounts in the range of 0.001 to 1.0 mole of acid per mole of HCHO are employed.

The halomethyltrimethylbenzenes which are synthesized according to the process of this invention are readily converted to tetramethylbenzenes by hydrogenation. The tetramethylbenzenes which are formed are chemicals of well-known utility. For example, durene is formed by the hydrogenation of 1-chloromethyl - 2,4,5 - trimethylbenzene which is readily synthesized according to the process of this invention. Durene is a well-known starting material for a number of chemical processes. For example, durene can be polymerized according to the process of U.S. Pat. 2,712,532 to form valuable polymers or it can be oxidized to pyromellitic anhydride as is well known to the art.

The advantages of this invention are further illustrated by the following examples. The reactants and the proportions and other specific conditions are presented as being typical and should not be construed to limit the invention unduly.

EXAMPLE I

A reactor was charged with 600 ml. of liquid sulfur dioxide ($SO_2$), 5 ml. of concentrated sulfuric acid, 31.5 g. of paraformaldehyde, and 360 g. of pseudocumene (1,2,4-trimethylbenzene).

The temperature was lowered to $-65°$ C. and hydrogen chloride was passed slowly into the mixture for 2 hours. The resulting reaction mixture then was stirred an additional 2 hours. A total of 125 ml. of water and 200 ml. of methylene chloride were added and the sulfur dioxide was allowed to dissipate over about 16 hours as the reaction mixture warmed to about 26° C. The product was taken up in methylene chloride, washed with water, and then saturated with aqueous sodium carbonate solution until neutral. It was dried with magnesium sulfate and filtered. Volatiles were stripped and 186 g. of excess pseudocumene were removed by distillation. The residue, which was comprised largely of 1-chloromethyl-2,4,5-trimethylbenzene and pseudocumene weighed 240 g.

EXAMPLE II

A solution comprising 20 grams of the product of Example I and 10 grams of sodium acetate trihydrate in 200 ml. of methanol was hydrogenated for about 16 hours over a Raney nickel catalyst at 50 p.s.i.g. The catalyst was removed by filtration and washed thoroughly with ether. The filtrate was treated with 200 ml. of water and extracted into ether. The combined ether extracts were washed with saturated aqueous sodium carbonate solution, dried with magnesium sulfate, filtered and stripped of ether. The residue which weighed 17.5 g. was analyzed by gas-liquid chromatography and found to contain 27 weight percent pseudocumene, 72.5 weight percent tetramethylbenzenes, and a trace of pentamethylbenzenes. The tetramethylbenzene portion was comprised of 85.4 weight percent durene, 1.6 weight percent isodurene, and 13.0 weight percent prehnitene.

The yield of tetramethylbenzenes based on the paraformaldehyde charged was calculated to be essentially quantitative. A yield of chloromethyl trimethylbenzenes was also calculated to be essentially quantitative. Selectivity to durene is noted to be quite good.

EXAMPLE III

A reactor was charged with 120 grams (1.0 mole) of pseudocumene, 106 grams (1.3 moles) of 36.6 percent aqueous formaldehyde, and 500 milliliters of hydrochloric acid. The reaction mixture was heated at 60–70° C. and hydrogen chloride was added for a period of 7 hours. Upon cooling to about 26° C. over a period of about 16 hours, the product was extracted with methylene chloride, washed, dried and the volatiles were removed as in Example I, leaving 164.2 grams of product. Distillation of 130 grams of the product under reduced pressure gave 107.9 grams of monochloromethylated product (B.P. 135–145° C.). Elemental analysis of the monochloromethylated product yielded the following results: C, 70.9%; H, 7.6%; Cl, 20.7%. Elemental composition of chlormethyl trimethylbenzene is calculated to be: C, 71.2%; H, 7.7%; Cl, 21.1%.

EXAMPLE IV

A 10 gram sample of the product of Example III, which weighed 164.2 g., was hydrogenated over a Raney nickel catalyst as described in Example II. Workup and gas-liquid chromatography as in Example II yielded the following data: trimethylbenzenes, 0.4 weight percent; tetramethylbenzenes, 89.3 weight percent; pentamethylbenzenes, 10.3 weight percent; and a trace of hexamethylbenzenes. The tetramethylbenzenes were comprised of 78.5 percent durene, 2.5 percent isodurene, and 18.6 percent prehnitene, all percents are by weight.

From the above data, a yield of 85 mole percent of tetramethylbenzenes was determined to have been produced based on the HCHO charged. Therefore, the yield of chloromethyl tetramethylbenzene is also 85 mole percent.

A comparison of all of the above data demonstrates that the prior art method of Example III produced considerably less of desired chloromethyl tetramethylbenzene products than the inventive process of Example I, i.e., 85 percent yield as compared to an essentially 100 percent yield.

Although this invention has been described in considerable detail, it must be understood that such detail is for the purposes of illustration only and that many variations and modifications can be made by one skilled in the art without departing from the scope and spirit thereof.

I claim:

1. A process for the halomethylation of trimethyl benzene comprising contacting in the liquid phase and under anhydrous conditions said trimethylbenzene with HCHO and a hydrogen halide in the presence of liquid $SO_2$ at a temperature ranging from −100° to −10° C. and at a pressure sufficient to maintain said $SO_2$ in the liquid phase wherein the mol ratio of said trimethylbenzene to said HCHO is in the range of 5:1 to 1:1, the mol ratio of said hydrogen halide to said HCHO is in the range of 10:1 to 0.5:1 and said $SO_2$ comprises 10 to 90 weight percent of said liquid phase.

2. A process according to claim 1 wherein said trimethylbenzene is 1,2,4-trimethylbenzene.

3. A process according to claim 1 wherein halomethylbenenes are produced.

4. A process according to claim 1 wherein at least one of said halomethylbenzenes is 1 - chloromethyl - 2,4,5-trimethylbenzene.

5. A process according to claim 1 wherein HCHO can represent monomeric formaldehyde, paraformaldehyde or trioxane and said hydrogen halide can be hydrogen bromide, hydrogen chloride, hydrogen fluoride or hydrogen iodide.

6. A process according to claim 1 wherein HCHO is paraformaldehyde and said hydrogen halide is hydrogen chloride.

7. A process according to claim 1 wherein said temperature ranges from −80° to −30° C. and the pressure is sufficient to maintain the resulting reaction mixture in the liquid phase.

8. A process according to claim 1 wherein said contacting is carried out under a pressure ranging from 0.5 to 100 atmospheres for a time ranging from 10 minutes to 72 hours.

References Cited

UNITED STATES PATENTS

| | | | |
|---|---|---|---|
| 3,069,480 | 12/1962 | Hirth et al. | 260—651 HA |
| 2,951,100 | 8/1960 | Adams et al. | 260—651 HA |
| 3,168,580 | 2/1965 | Adams | 260—651 HA |
| 2,245,721 | 6/1941 | Ross et al. | 260—476 R |
| 3,021,375 | 2/1962 | Waid et al. | 260—651 HA |
| 3,294,850 | 12/1966 | Ayers et al. | 260—651 HA |

HOWARD T. MARS, Primary Examiner